(12) United States Patent
Imabeppu et al.

(10) Patent No.: US 11,279,623 B2
(45) Date of Patent: Mar. 22, 2022

(54) HYDROUS SILICA FOR RUBBER-REINFORCING FILLER

(71) Applicant: TOSOH SILICA CORPORATION, Tokyo (JP)

(72) Inventors: Yuta Imabeppu, Yamaguchi (JP); Hideo Kanemitsu, Yamaguchi (JP)

(73) Assignee: TOSOH SILICA CORPORATION

( * ) Notice: Subject to any disclaimer, the term of this patent is extended or adjusted under 35 U.S.C. 154(b) by 0 days.

(21) Appl. No.: 17/253,999

(22) PCT Filed: Jun. 21, 2019

(86) PCT No.: PCT/JP2019/024672
§ 371 (c)(1),
(2) Date: Dec. 18, 2020

(87) PCT Pub. No.: WO2020/031523
PCT Pub. Date: Feb. 13, 2020

(65) Prior Publication Data
US 2021/0253436 A1  Aug. 19, 2021

(30) Foreign Application Priority Data
Aug. 10, 2018 (JP) .............................. JP2018-151034

(51) Int. Cl.
*C01B 33/18* (2006.01)
*C08K 3/36* (2006.01)
(Continued)

(52) U.S. Cl.
CPC .............. *C01B 33/18* (2013.01); *C01B 33/12* (2013.01); *C08K 3/36* (2013.01); *B60C 1/0016* (2013.01);
(Continued)

(58) Field of Classification Search
None
See application file for complete search history.

(56) References Cited

U.S. PATENT DOCUMENTS

2005/0032965 A1* 2/2005 Valero .................... A61Q 11/00
524/493
2008/0293871 A1 11/2008 Stenzel et al.
2018/0163026 A1* 6/2018 Blackman ................ C08K 3/04

FOREIGN PATENT DOCUMENTS

CN          1541186 A   10/2004
CN          1594408 A    3/2005
(Continued)

OTHER PUBLICATIONS

First Office Action for Chinese application No. 201980010493.8; dated Feb. 18, 2021 (9 pages) Machine Translation.
(Continued)

*Primary Examiner* — Ronak C Patel
(74) *Attorney, Agent, or Firm* — Mendelsohn Dunleavy, P.C.

(57) ABSTRACT

The present invention pertains to a hydrous silica for rubber-reinforcing filler, having a BET specific surface area ranging from 230 to 350 m²/g; the volume average particle diameter (D50) measured by the laser diffraction method after dispersing 50 ml of a hydrous silica slurry adjusted to 4% by weight with an ultrasonic homogenizer having an output of 140 W for 10 minutes is 3.0 μm or less; and the top 10% of particles (D90) in the particle size distribution is 10.0 μm or less. This invention provides a hydrous silica capable of further improving reinforcing properties of a rubber, particularly the wear resistance by improving dispersibility of the hydrous silica in the rubber in addition to rubber reinforcing properties obtained by a high BET specific surface area.

14 Claims, 3 Drawing Sheets

Fig. Particle size distribution of example 1
(Laser Diffraction System: Microtrac MT-3300II)
---------- Granulated hydrous silicate
———— After dispersion (4%conc.,140W,10min)

(51) Int. Cl.
*C01B 33/12* (2006.01)
*B60C 1/00* (2006.01)

(52) U.S. Cl.
CPC ...... *C01P 2004/51* (2013.01); *C01P 2004/61* (2013.01); *C01P 2006/12* (2013.01); *C01P 2006/14* (2013.01); *C01P 2006/16* (2013.01); *C01P 2006/40* (2013.01); *C01P 2006/90* (2013.01); *C08K 2201/005* (2013.01); *C08K 2201/006* (2013.01)

(56) References Cited

FOREIGN PATENT DOCUMENTS

| | | | |
|---|---|---|---|
| CN | 1871281 | A | 11/2006 |
| CN | 101115785 | A | 1/2008 |
| CN | 101959700 | A | 1/2011 |
| CN | 102167337 | A | 8/2011 |
| CN | 102491351 | A | 6/2012 |
| CN | 107636058 | A | 1/2018 |
| CN | 107709438 | A | 2/2018 |
| DE | 102006060357 | A1 | 7/2007 |
| EP | 723259 | * | 7/1996 |
| EP | 1762544 | A1 | 3/2007 |
| JP | H10-194722 | A | 7/1998 |
| JP | H11-228125 | A | 8/1999 |
| JP | H11-240982 | A | 9/1999 |
| JP | 2000-072434 | A | 3/2000 |
| JP | 2005-534609 | A | 11/2005 |
| JP | 2011-516630 | A | 5/2011 |
| JP | 2012-017440 | A | 1/2012 |
| JP | 2017-002210 | A | 1/2017 |
| JP | 2017-514773 | A | 6/2017 |
| JP | 2018-151033 | A | 9/2018 |
| WO | 2016199429 | A1 | 12/2016 |
| WO | 2016199744 | A1 | 12/2016 |

OTHER PUBLICATIONS

Non-Final Office Action for U.S. Appl. No. 16/976,709; dated Mar. 30, 2021 (9 pages).
International Preliminary Report on Patentability (Chapter 1) for corresponding International application No. PCT/JP2019/024672; dated Feb. 25, 2021; Machine Translation (11 pages).
International Preliminary Report on Patentability (Chapter I) for International application No. PCT/2019/024671; dated Feb. 25, 2021; Machine Translation (11 pages).
Examination Report for Indian application No. 202027035499; dated Mar. 31, 2021 (5 pages).
International Search Report for corresponding International application No. PCT/JP2019/024672; dated Aug. 13, 2019 (8 pages).
First Office Action for corresponding Chinese application No. 201980041332.5 dated May 28, 2021 (13 pages) Machine Translation.
Notice of Reasons for Revocation for corresponding Japanese application No. 2018-151034; dated Oct. 29, 2021 (28 pages) Machine Translation.
Notice of Opposition for corresponding Japanese Patent Application No. 2018-151034; dated Jul. 12, 2021 (67 pages) Machine Translation.
Office Action for Indian patent application No. 202027035499; dated Oct. 8, 2021 (2 pages).
Extended European Search Report and Written Opinion for corresponding European application No. 19848513.8; dated Sep. 20, 2021 (5 pages).

* cited by examiner

Fig. 1

Fig. Pore size distribution of example 1 at 10kPa-400MPa (Hg)

Fig. 3

Fig. Pore size distribution of example 1 at 10-400kPa (Hg)

HYDROUS SILICA FOR RUBBER-REINFORCING FILLER

TECHNICAL FIELD

The present invention relates to a hydrous silica for rubber reinforcing filler. In particular, the present invention provides a hydrous silica for rubber reinforcing fillers which can achieve a high degree of dispersibility and provide a high reinforcing property, (particularly the wear resistance), when compounded in tires and various industrial rubber products.

CROSS REFERENCE TO RELATED APPLICATIONS

This application claims priority to Japanese Patent Application No. 2018-151034, filed Aug. 10, 2018, the entire disclosure of which is specifically incorporated herein by reference.

BACKGROUND OF THE INVENTION

Carbon black has long been used as a reinforcing filler for rubber. On the other hand, in recent years, hydrous silica has been widely used as a white reinforcing filler for the reason that it is possible to reduce rolling resistance and easily colorize rubber. In particular, in the case where rubber being compounded hydrous silica is used for a tire tread, rolling resistance can be reduced, and therefore, in recent years, a tread of a pneumatic tire containing hydrous silica has attracted attention. In addition, hydrous silica is required to improve the reinforcing properties of rubber (particularly the wear resistance), due to consideration for the environment, and the demand for hydrous silica is becoming increasingly high.

The hydrous silica has a silanol group (—SiOH) on its surface, and combines with rubber molecules to contribute to the improvement of the reinforcing property. The number of silanol groups of hydrous silica increases as the specific surface area increases (the smaller the primary particles described later). Therefore, it is said that the hydrous silica having a high specific surface area improves the reinforcing property of the rubber.

The main factors for improving the rubber reinforcing property of the hydrous silica are two of (1) high BET specific surface area and (2) good dispersibility. Hydrous silica has a structure in which primary particles of about 10 to 60 nm are aggregated to a particle size of about 2 to 100 μm, and the BET specific surface area is about 50 to 250 $m^2/g$. It is also known that as the BET specific surface area increases, the primary particles become smaller, and silanol groups on the surface are densely aggregated by hydrogen bonding, thereby increasing the aggregation strength. On the other hand, in the case of hydrous silica for rubber reinforcing filler, it is important to increase the specific surface area, but at the same time, the rubber reinforcement is increased as the dispersibility is improved. From this viewpoint, it is preferable that the aggregation is weak.

As a technique focusing on the BET specific surface area, there has been known an attempt to improve the rubber-reinforcing property by increasing the BET specific surface area and adding an additive (patent document 1, 2).

Patent document 1 discloses a process for the preparation of hydrous silica for rubbers. Polycarboxylic acid and aluminum are added to enhance the bonding strength between the polymer and the hydrous silica to improve the reinforcing property. However, in the manufacturing method described in patent document 1, since acidic reactions are used, the resulting hydrous silica has a strong aggregation and is difficult to disperse.

Patent document 2 discloses inventions relating to hydrous silica with aluminum added to their surfaces. Hydrous silica having a high specific surface area (here, a CTAB specific surface area of 160 $m^2/g$ or more) and a specified nitrogen pore distribution tends to be penetrated by rubber molecules. It is proposed to enhance the bonding strength with rubber molecules by adding aluminum to the surface of such hydrous silica to improve the reinforcing property.

An improvement in the dispersibility of hydrous silica is disclosed in patent document 3. Patent document 3 evaluates dispersibility on the basis of the wk ratio, and hydrous silica having a low wk ratio and good dispersibility has been proposed. In patent document 3, at the same time as improving dispersibility, $Al_2O_3$ is added to the hydrous silica to enhance the bonding strength between the polymers and the hydrous silica, thereby improving the reinforcing property. The hydrous silica (precipitated silica) described in patent document 3 has a $Al_2O_3$ content of 2 to 5.0 wt % and a wk ratio of less than 3.4, a CTAB surface area of 80 to 139 $m^2/g$ and a BET-specific surface area of 80 to 180 $m^2/g$.

Patent document 1: JP-A-2017-514773 (WO2015/121332)
Patent document 2: JP-A-2017-2210
Patent document 3: JP-A-2000-72434

The entire description of patent documents 1 to 3 is specifically incorporated herein by reference.

SUMMARY OF THE INVENTION

In addition to further improving the reinforcing property, particularly the wear resistance, a hydrous silica having good dispersibility in rubber and good workability at the time of mixing operation has been demanded more than in the past. However, in the hydrous silica described in patent document 1 or 2, although the specific surface area is improved, as described above, the hydrous silica having a high specific surface area has a strong aggregation structure due to the small size of the primary particles, and therefore, satisfactory dispersibility cannot be obtained. In the hydrous silica described in patent document 3, the dispersibility can be improved to some extent, but the specific surface area is not sufficient and the reinforcing property is not sufficient.

In addition, when hydrous silica having a high specific surface area is granulated to improve handling performance, the aggregation structure becomes stronger than that in the case of a low specific surface area, resulting in further deterioration of dispersibility. In particular, in the process of patent document 1 in which synthesis is made by neutralization in acidic reaction, the BET specific surface area can be easily increased, and at the same time, when the hydrous silica is compounded (mixed) into the rubber, the hydrous silica is mixed quickly at the stage of the initial mixing, so that the handling performance is very excellent. However, on the other hand, even at the end of the rubber compounding, the hydrous silica is not dispersed in the rubber and sufficient reinforcement cannot be obtained. It can be said that these dispersion defects do not contribute to the improvement of the reinforcing property, and it is preferable that the dispersion defects are small from the viewpoint of the quality stability.

There is a need to develop a hydrous silica for rubber reinforcing filler having such a relatively high BET-specific surface area (e.g., 230 $m^2/g$ or more), which has improved dispersibility in rubber, further improved wear resistance, and improved handling performance.

The problem to be solved by the present invention is to provide a hydrous silica for rubber reinforcing filler, which has improved handling performance when compounded into rubber, improved dispersibility in rubber, and desired tear strength and wear resistance as rubber reinforcement in compounded rubber.

The rubber reinforcing property has been conventionally obtained in the case of hydrous silica having a relatively high BET specific surface area (e.g., 230 m$^2$/g or more) as described above, but the object of the present invention is to provide a hydrous silica capable of further improving reinforcing performance of a rubber, particularly the wear resistance, by improving dispersibility of the hydrous silica in the rubber in addition to rubber reinforcing properties obtained by a high BET specific surface area.

Means for Solving the Problem

The inventors of the present invention conducted various studies in order to develop a hydrous silica having a high BET-specific surface area (e.g., 230 m$^2$/g or more), which has improved handling performance when compounded into a rubber, and also improved dispersibility in the rubber.

In particular, the inventors of the present invention have analyzed how the hydrous silica is dispersed in the rubber as the mixing period elapses when the hydrous silica is compounded into the rubber and mixed. Based on this analysis result, it was further examined what kind of particles structure and pore structure the hydrous silica has, can solve the above problem.

The results show that a hydrous silica satisfying that the BET specific surface area ranges from 230 to 350 m$^2$/g;

the volume average particle diameter (D50) measured by the laser diffraction method after dispersing 50 ml of a hydrous silica slurry adjusted to 4% by weight with an ultrasonic homogenizer having an output of 140 W for 10 minutes is 3.0 μm or less; and the top 10% of particles (D90) in the particle size distribution is 10.0 μm or less, is a hydrous silica with ideal performance as a hydrous silica for rubber-reinforced filler which simultaneously satisfies three independent performances of high BET specific surface area, high dispersibility and handling performance. The present invention has been completed by this finding.

The present invention is as follows.

[1]
A hydrous silica for rubber reinforcing filler characterized in that the BET specific surface area ranges from 230 to 350 m$^2$/g;

the volume average particle diameter (D50) measured by the laser diffraction method after dispersing 50 ml of a hydrous silica slurry adjusted to 4% by weight with an ultrasonic homogenizer having an output of 140 W for 10 minutes is 3.0 μm or less; and the top 10% of particles (D90) in the particle size distribution is 10.0 μm or less.

[2]
The hydrous silica according to [1], wherein the pore volume of 1.9-100 nm pore radius measured by the mercury press-in method ranges from 1.40 to 2.00 cm$^3$/g.

[3]
The hydrous silica according to [1] to [2], wherein the pore volume in the range of 100 nm to 1,000 nm of pore radius as measured by mercury press-in method ranges from 0.50 to 1.00 cm$^3$/g.

[4]
The hydrous silica according to any one of [1] to [3], wherein the pore volume in the range of 1.6 to 62 μm of pore radius measured by mercury press-in method ranges from 0.18 to 0.80 cm$^3$/g, and the hysteretic pore volume difference in the range of 10 to 400 kPa measured by mercury press-in method is 0.07 cm$^3$/g or more.

[5]
The hydrous silica according to any one of [1] to [4], wherein the residual amount when classified with a sieve having an aperture of 200 μm is 70% by weight or more of the total and the pellet hardness is in the range of 5 to 35 cN.

[6]
The hydrous silica according to any one of [1] to [5], wherein CATB specific surface area ranges from 200 to 350 m$^2$/g.

[7]
The hydrous silica according to any one of [1] to [6], wherein pH of 4% by weight slurry is in the range of 5 to 8, the electric conductivity of the filtrate of the slurry is less than 1,000 μS/cm, and the moisture content is less than 9%.

[8]
The hydrous silica according to any one of [1] to [7], which is a compacted body.

Advantageous Effects of the Invention

According to the present invention, it is possible to provide a hydrous silica having excellent rubber reinforcing properties, particularly the wear resistance, in which the rubber reinforcing properties are added by improving handling performance when compounded into the rubber, making the BET specific surface area within a predetermined range, and improving dispersibility of the hydrous silica into the rubber.

MODES FOR CARRYING OUT THE INVENTION

<Hydrous Silica>

The present invention is a hydrous silica for rubber-reinforced filler having the following characteristics:

the BET specific surface area ranges from 230 to 350 m$^2$/g, the volume average particle diameter (D50) measured by the laser diffraction method after dispersing 50 ml of a hydrous silica slurry adjusted to 4% by weight with an ultrasonic homogenizer having an output of 140 W for 10 minutes is 3.0 μm or less; and the top 10% of particles (D90) in the particle size distribution is 10.0 μm or less.

In the hydrous silica of the present invention, when the BET specific surface area is less than 230 m²/g, the reinforcing property is inadequate as in a conventional manner. As the BET specific surface area increases, the production of hydrous silica tends to be difficult, and the production of hydrous silica having a BET specific surface area of more than 350 m²/g is practically difficult. The range of the BET-specific surface area is preferably 230 m²/g or more, more preferably 240 m²/g or more, further more preferably 250 m²/g or more, preferably 340 m²/g or less, more preferably 330 m²/g or less, further more preferably 325 m²/g or less.

The hydrous silica for rubber-reinforcing filling is generally mixed with the raw rubber, carbon black and other compounding agents using a Banbury mixer or a mixing roll, compounded in the rubber and mixed and dispersed. At the time of mixing and dispersing these, the hydrous silica is dispersed while being crushed by a high shearing force. The present inventors have found that when the hydrous silica is dispersed in the rubber, the dispersed state can be approximated to the volume particle size distribution measured by the laser diffraction method after dispersing 50 ml of hydrous silica slurry adjusted to 4% by weight with an ultrasonic homogenizer having an output of 140 W for 10 minutes from the measurement of the amount of mechanical energy at the time of mixing and dispersing in the rubber and the dispersion state of the hydrous silica when actually dispersed in the rubber, and found further that the hydrous silica having 3.0 μm or less of the volume average particle diameter (D50) measured under this condition and having 10.0 μm or less of the top 10% particles (D90) in the particle size distribution measured under the condition solves the problems of the present invention.

These two values are close to the dispersed state when hydrous silica is dispersed in rubber. When the volume average particle diameter (D50) is more than 3.0 μm, it suggests that the hydrous silica is not sufficiently ground and mixed in the rubber. The volume average particle diameter (D50) is preferably 2.0 μm or less, more preferably 1.0 μm or less. When the top 10% of particles (D90) in the particle size distribution is more than 10.0 μm, the presence of undispersed aggregates is suggested. That is, the dispersion is poor, which leads to deterioration of the dispersibility and the reinforcing property. D90 is preferably 5.0 μm or less, more preferably 3.0 μm or less.

The Embodiment Described in [2]

In the hydrous silica of the present invention, the pore volume of 1.9 to 100 nm pore radius measured by the mercury press-in method ($V_{HP-Hg}$) preferably ranges from 1.40 to 2.00 cm³/g (the embodiment described in [2]).

By the mercury press-in method, the pore volume in the range of 1.9 nm to 6,400 nm can be measured by boosting the maximum pressure from 100 kPa to 400 MPa. The hydrous silica of the present invention preferably has a pore volume in the range of 1.40 to 2.00 cm³/g measured in the range of 1.9 nm or more and 100 nm or less by mercury press-in method ($V_{HP-Hg}$). The pore distribution measurement by the mercury press-in method is a method in which the pore distribution is obtained from the amount of pressurizing mercury, which is difficult to wet, into a sample and intruding into the sample.

The pore distribution by the mercury press-in method of the present invention is the pore distribution obtained when the pressure is increased (measured from the larger pore diameter), unless otherwise specified. When $V_{HP-Hg}$ is 1.40 cm³/g or more, sufficient rubber-reinforcing property is obtained, and when it is 2.00 cm³/g or less, production of hydrous silica does not become difficult. $V_{HP-Hg}$ is preferably 1.50 cm³/g or more, more preferably 1.60 cm³/g or more, preferably less than 1.95 cm³/g, more preferably 1.90 cm³/g or less.

The Embodiment Described in [3]

The hydrous silica of the present invention preferably has a pore volume $V_{MP-Hg}$ in the range of 100 nm to 1,000 nm (medium pressure range) as measured by the mercury press-in method in the range of 0.50 to 1.00 cm³/g (the embodiment described in [3]).

If the pore volume $V_{MP-Hg}$ is less than 0.50 cm³/g, there is a tendency for either the aggregation structure in this area (macropores) to be too strong (consolidated at levels where the aggregation does not collapse) or the aggregation structure to be extremely weak, so that the pores are crushed and solidified by the pressure of mercury. Therefore, even if mixed and dispersed in the rubber, there is a strong tendency to exist as hydrous silica aggregates in the rubber, and the improvement of the reinforcing property becomes insufficient in some cases. Further, if the aggregation structure is strong as described above, it may be difficult to set the D50 after the ultrasonic dispersion to less than 3.0 μm.

Conversely, hydrous silica having a pore volume $V_{MP-Hg}$ of more than 1.00 cm³/g is often present in the form of fine particles of hydrous silica. Alternatively, the bulk specific gravity is low (light), and dust is generated even during mixing, which may cause deterioration of the working environment, and penetration into the rubber may become difficult. Therefore, the dispersion at the early stage of the time of mixing is deteriorated, sufficient dispersion is not performed, and consequently, the reinforcing property may be lowered.

The Embodiment Described in [4]

The hydrous silica of the present invention preferably has a pore volume $V_{LP-Hg}$ of 0.18 to 0.80 cm³/g in the range of pore radius of 1.6 to 62 μm (low pressure range) as measured by the mercury press-in method. Further, the hydrous silica of the present invention preferably has a pore volume (hysteretic pore volume difference in the range of 10 to 400 kPa (low pressure range)) of 0.07 cm³/g or more when the pressure is raised to 400 kPa and then lowered to 10 kPa by the mercury press-in method (the embodiment described in [4]).

If the pore volume $V_{LP-Hg}$ is 0.18 cm³/g or more, the pressure density becomes too high and there is no cause of the dispersion failure, if the pore volume $V_{LP-Hg}$ is 0.80 cm³/g or less, it is sufficient as a shape, and the handling performance is also good. The pore volume $V_{LP-Hg}$ more preferably ranges from 0.18 to 0.50 cm³/g.

If the difference in hysteretic pore volume is 0.07 cm³/g or more, it does not show a state in which it does not disperse at the early stage of mixing into rubber because the aggregation structure is too strong (good initial dispersibility). The hysteretic pore volume differential is more preferably 0.10 cm³/g or greater.

The Embodiment Described in [5]

The hydrous silica of the present invention preferably has a residual content of not less than 70% by weight of the total weight when classified with a sieve having an aperture of 200 μm, and has a pellet hardness of 5 to 35 cN (the embodiment described in [5]). If the amount of the residue when classified by a sieve having a sieve opening of 200 μm is 70% by weight or more of the whole, the generation of dust can be suppressed while the handling performance is good. If the pellet hardness is 5 cN or more, the generation of dust can be prevented, the handling performance is good, and the dispersibility at the early stage is good. If the pellet hardness is 35 cN or less, the final dispersion performance is also good.

The Embodiment Described in [6]

The hydrous silica of the present invention preferably has a CTAB specific surface area ranging from 200 to 350 $m^2/g$ (the embodiment described in [6]). In the case of hydrous silica satisfying at least the condition of the present invention described in [1], high reinforcement can be obtained when compounded in rubber, and in addition, high reinforcement can be surely obtained when CTAB specific surface area is within the above ranges. When CTAB specific surface area is more than 350 $m^2/g$, it may be difficult to produce the hydrous silica per se. CTAB specific surface area is preferably 220 $m^2/g$ or more, more preferably 240 $m^2/g$ or more.

In addition, in the hydrous silica of the present invention, BET/CTAB ratio, which is the ratio of the two specific surface areas, BET-specific surface area and CTAB specific surface area, preferably ranges from 1.0 to 1.2. When BET/CTAB ratio is 1.2 or less, a dense aggregate is not formed, and dispersibility in rubbers is good. Hydrous silica having a BET/CTAB ratio of 1.0 or more can be produced.

The Embodiment Described in [7]

The hydrous silica of the present invention preferably has an electric conductivity of filtrate of 4 wt % slurry less than 1,000 μS/cm, a pH of 4 wt % suspension in the range of 5 to 8, a moisture content less than 9 wt % (embodiment described in [7]). If the electrical conductivity is less than 1,000 μS/cm, aggregation is less likely to occur over time, more preferably less than 800 μS/cm, and further more preferably less than 500 μS/cm.

The pH ranging from 5 to 8 of the 4% by weight slurry is equivalent to the pH of a conventional hydrous silica. If the pH is within this range, good vulcanization properties and reinforcing properties can be obtained.

Suitably, the hydrous silica of the present invention has a moisture content of less than 9%, and a moisture content of less than 9% is approximately equivalent to the moisture content of conventional hydrous silica. If the moisture content is within this range, good vulcanization properties and reinforcing properties can be obtained. The electrical conductivity and pH can be controlled by a water washing step in the manufacturing process, and the moisture content can be controlled by a drying step.

<Preparation Process>

The hydrous silica of the present invention is a novel hydrous silica having an aggregation structure that differs from conventional hydrous silica, as described above. The process for the preparation of this hydrous silica will be explained by way of example (the process of the present invention will be referred to as a multistage process).

A synthetic method by the following multistage reactions can be exemplified, and the hydrous silica of the present invention can be obtained by a synthetic method including steps i) to vii). However, the consolidation step vii) can be omitted if the granulation of the hydrous silica can be performed to some extent in step vi).

i) Pre-charging the reactor with an alkaline silicate solution adjusted to a specified pH (pH9.5 to 12), ii) A neutralization reaction step including a step of dropping an alkali silicate aqueous solution and a mineral acid simultaneously, and a step of dropping only mineral acid without adding an alkali silicate aqueous solution, iii) A step of dropping the alkali silicate solution and the mineral acid simultaneously, provided that the respective flow rates are independently in the range of 20 to 80% of the flow rate in the step of dropping the alkali silicate solution and mineral acid simultaneously in step ii), iv) A step in which only mineral acid is added dropwise without adding an aqueous solution of alkali silicate and the neutralization reaction is stopped at a pH<7.

However, steps i) to iv) are carried out while the reactant slurry is stirred and/or circulated while maintaining at the range of 70 to 90° C., and steps ii) to iii) are carried out while maintaining at the range of pH 9.5 to 12.

v) Filtration of the obtained hydrous silica slurry and washing with water in an amount equal to or more than the cake of the obtained hydrous silica, vi) Drying step to adjust the moisture content of hydrous silica, vii) A step of performing consolidation molding of the obtained hydrous silica.

The alkali silicate aqueous solution is not particularly limited, and, for example, commercially available sodium silicate can be used. The mineral acid is not particularly limited, but sulfuric acid is preferable, and any of dilute sulfuric acid to concentrated sulfuric acid can be used as the concentration.

Steps i) to ii) are a preparation step for making the BET specific surface area 230 $m^2/g$ or more and a preparation step for forming a hydrous silica exhibiting 3.0 μm or less of the volume average particle diameter (D50) and 10.0 μm or less of the top 10% of particles (D90). In step i), for example, a commercially available aqueous alkali silicate solution is diluted with water and adjusted to a predetermined pH. As long as pH can be maintained within a predetermined pH range, it may or may not be supplemented with other compound such as salts.

The order of the step of dropping the alkali silicate aqueous solution and the mineral acid simultaneously and the dropping only the mineral acid without adding the alkali silicate aqueous solution in step ii) are in random. For example, the step of dropping only the mineral acid without adding the alkali silicate aqueous solution may be performed in any of the first half, the intermediate half, and the second half of the step ii).

Step iii) is a newly added step in the present invention which is not present in the conventional process. By adding this step, it is possible to obtain a hydrous silica exhibiting 3.0 μm or less of the volume average particle diameter (D50) and 10.0 μm or less of the top 10% of particles (D90). Step iii) may be performed, for example, at a constant flow rate in the range of 20% to 80% for the simultaneous dropping step of step ii), or may be performed by changing the flow rate at least once in the above range in the middle of the step. The flow rates of the aqueous alkali silicate solution and the mineral acid preferably range from 20 to 60% of the flow rates of the aqueous alkali silicate solution and the mineral acid in step ii) from the standpoint of obtaining a hydrous silicate having the desired structure.

It is recommended that steps ii) and iii) be completed in a total of about 80 to 140 minutes, preferably about 100 to 130 minutes. The steps ii) and iii) may be repeated two or more times. That is, for example, the first step ii) and step iii) may be carried out, and then the step iv) may not be carried out, but the steps ii) and iii) may be carried out again, and then the step iv) may be carried out. The repetition of steps ii) and iii) can be carried out, for example, twice, three times or four times. Repeating steps ii) and iii) advantageously facilitates obtaining hydrous silica having the desired structure properties.

The hydrous silica of the present invention is maintained in the neutralizing reaction step at least pH7, preferably pH10.0 to 12.0, more preferably pH11.0 to 12.0, at all times until the reaction is stopped (step iii) above). Furthermore, during the neutralization reaction, it is appropriate to carry out one or both of stirring and circulation of the slurry. In particular, the higher the stirring speed and the circulation speed, the more the aggregation of the hydrous silica can be suppressed, which is favorable for the production of the hydrous silica of the present invention.

The step of stopping the neutralization reaction of step iv) is carried out by stopping the addition of the alkali silicate aqueous solution and continuing the dropwise addition of only the mineral acid. It is appropriate to continue the dropwise addition of the mineral acid only until pH of the reaction solution (slurry) becomes less than 7.

Filtration and water washing of the hydrous silica in step v) may be performed by, for example, a filter press or the like, or a filter press having a pressing function may be used to perform water washing and then press may be added.

Step vi) is a drying step in which the moisture content is controlled to a predetermined value. The method of the drying step is not particularly limited, and specifically, a static drying method may be employed, and a method of controlling by a commercially available dryer such as a spin flash dryer in addition to the above-mentioned spray dryer can be exemplified. If granulation is also carried out in addition to drying by any of these drying methods, compaction of step vii) can be omitted. The granulation can be carried out by appropriately setting the conditions according to the drying method.

<Use of Additives>

After washing with water, an additive (aluminum, surfactant, silane coupling agent, or the like) for improving the rubber reinforcing property may be added in advance. However, since the hydrous silica of the present invention is easy to obtain high reinforcing property even if these additives are not added at all, it is preferable to add the additives at the time of compounding the rubbers described later. When the additive is inevitably added, for example, a method in which water is added to the hydrous silica cake obtained in step v) to be re-slurried and then the additive is added and dried by a spray dryer or the like can be exemplified.

Step vii) is a step of compacting the hydrous silica obtained in the drying step. By compacting, the pore volume and its structure of 1.6 μm to 62 μm (1,600 to 62,000 nm) radius can be controlled. As described above, although it can be controlled only by the above step vi), it is preferable to compact the dried hydrous silica from the standpoint of stably controlling structure property. Further, compaction is preferable from the viewpoint that the residual amount when classified by a sieve having an aperture of 200 μm or more can be 70% by weight or more and the pellet hardness can be 5 to 35 cN.

As a specific compaction method, a molding machine by a commercially available dry method can be used, but there is no particular restriction. There are roughly three types of compaction methods, i.e., mixing molding, forced molding, and heat to utilizing molding. In the present invention, it is particularly preferable to use forced molding.

The forced molding method further includes a compaction method such as a compressing roll, a briquetting roll, and tableting, an extrusion molding method using screws, and the like, and in the present invention, it is particularly preferable to use a consolidation molding method. On the other hand, an excessive compaction machine such as a tablet press is not preferable because the pores structure of the hydrous silica may be excessively crushed, so that the object of the present invention may not be achieved.

In the case of a commercially available roll-type molding machine, a powder of hydrous silica is pressed and compressed between rotating press rolls while being pressurized by the rotational of a feed screw, and compact into a plate shape or a granular shape. The press rolls may be smooth, grooved, corrugated, etc., and any roll may be used in the present invention. In any case, the roll shape, the speed, the pressure, and the like are adjusted so as to obtain an appropriate pore size, particle size, and pellet hardness as described above.

Methods such as granulation and compaction are commonly used in hydrous silica for rubber reinforcing filler in order to further improve the dust generation and handling performance of hydrous silica.

Although the BET specific surface area of hydrous silica of the present invention is 230 $m^2/g$ or more, the pore volume of 1,000 nm or less (micropores to macropores) is less likely to change even when the hydrous silica is granulated or compacted under certain conditions, so that good rubber reinforcement can be maintained. Therefore, even if the compaction or granulation under moderate constant conditions, it acts only to improve handling performance and the prevention of dust generation, the rubber reinforcing property is not lowered.

<Rubber Compounding>

The hydrous silicate of the present invention can be used as a reinforcing filler for various rubber compositions, and the use of the rubber composition includes not only tires but also industrial parts such as belts. The rubber composition which can use (include) the hydrous silicate of the present invention is not particularly limited, and may be a rubber composition including a natural rubber (NR) or a diene-based synthetic rubber alone or a blend thereof. Examples of synthetic rubbers include synthetic polyisoprene rubber (IR), butadiene rubber (BR), styrene butadiene rubber (SBR), acrylonitrile butadiene rubber (NBR), butyl rubber (IIR) and the like.

The hydrous silica of the present invention can be compounded in an amount of, for example, 5 to 100 parts by weight with respect to 100 parts by weight of natural rubber and/or diene-based synthetic rubber. However, this range is not intended to be limiting.

<Additives for Rubber Compounding>

In the above rubber composition, various additives used in the rubber composition such as aluminum compound, silane coupling agent, surfactant and the like can be added (in addition to being added to the hydrous silica) as required at the time of rubber compounding.

When the hydrous silica of the present invention is used in rubber compositions, in addition to the above-mentioned rubber (additive), compounding ingredients commonly used in the rubber industry such as carbon black, softeners (waxes, oils), aging inhibitors, vulcanizing agents, vulcanizing accelerators, and the like can be appropriately compounded as required. The rubber composition can be prepared by a commercial mixing machine such as a mixing roll or a Banbury mixer using the above rubber component, hydrous silica, silane coupling agent, and the above carbon black, rubber blending agent, or the like compounded as necessary.

The mixing rubber composition is molded into a desired shape and then vulcanized into various rubber products.

Rubber compositions containing the present invention hydrous silica can be suitably applied to rubber products such as tires, conveyor belts, hoses, and the like, and rubber products such as tires, conveyor belts, hoses, and the like, which become products, are excellent in reinforcing properties, high wear resistance, and the like. In addition, a pneumatic tire using a rubber composition containing a hydrous silica of the present invention can be obtained by using the above rubber composition for a tire tread portion, and a pneumatic tire excellent in reinforcing property and high wear resistance of the tire tread portion can be obtained.

EXAMPLES

The present invention is further specifically described on the basis of Examples. However, the Examples are illustrative of the present invention, and the present invention is not intended to be limited to the Examples.

Determination of the Physical Properties of Hydrous Silica

BET Specific Surface Area ($N_2$ Specific Surface Area)

Fully Automated Specific Surface Area Measurements device (Model: Macsorb® HM model-1201; manufactured by Mountec Corporation) was used for measurement by the one-point method.

CTAB Specific Surface Area

Measurements were based on JIS K 6430 (Rubber compounding ingredients silica test methods). However, the adsorption cross-sectional area of CTAB molecules was calculated as 35 Å$^2$.

Pore Distribution by Mercury Press-in Method 1 [Pore Radius 1.9 to 1,000 nm]

Mercury porosimeter (model: PASCAL 440; manufactured by ThermoQuest) was used to measure mercury pore distributions and pore volumes ranging from 100 kPa to a maximum pressure of 400 MPa and pore radius ranging from 1.9 to 6,400 nm. The measured results were analyzed by the attached software, and the pore volume of 1.9 to 100 nm ($V_{HP-Hg}$) was calculated.

Pore Distribution by Mercury Press-in Method 2 [Pore Radius 1.6 to 62 μm (1,600 to 62,000 nm)]

Mercury porosimeter (model: PASCAL 140; manufactured by ThermoQuest) was used to measure mercury pore distributions and pore volumes ranging from 10 kPa to 400 kPa and pore radius ranging from 1,600 to 62,000 nm (or 1.6 to 62 μm). The pore volume (hysteresis pore volume difference) was also measured when the pressure was further increased to 400 kPa and then decreased to 10 kPa. Molded hydrous silica of about 1.5 mm was measured.

Particle Size

Using a laser diffraction type particle size distribution measuring device (model: Microtrac MT-3000II; manufactured by Microtrac Bell), 50% of the volume integrated value (D50 value) and 90% value from the bottom (D90 value) in the particle size distribution was calculated. The sample was prepared by dispersing 50 ml of a hydrous silica slurry adjusted to 4% by weight with pure water with an ultrasonic homogenizer (model: Sonfier 250D; manufactured by BRANSON) having an output of 140 W for 10 minutes (equivalent energy when dispersed in rubber). (Example 1 also measured the particle size before ultrasonic homogenizer dispersion as a reference)

Measurement of pH

Based on JIS K 5101-17-2 (pigment test method), pH of slurry adjusted to 4% by pure water was measured at a stable value of the indicated value using a commercial glass-electrode pH meter (model: F-53; manufactured by HORIBA, LTD., Ltd.).

Electric Conductivity 4 g hydrous silica (105° C., heat loss after drying for 2 hours is 6% or less) was added to 50 ml of distilled water, mixed well, and boiled for 5 minutes. The total volume was then adjusted to 100 ml using distilled water, filtered off, and the filtrate was measured using a conductivity meter (model: CM30R; manufactured by Toa DKK).

Moisture Content

The weight loss after drying at 105° C. for 2 hours was determined based on JIS K 5101-15-1 (Pigment Test Procedure).

Pellet Hardness

Pellet hardness of JIS K 6219-3 (Carbon Black for Rubber Industry—Characteristics of pelletized carbon black) based on Method B, sieves were stacked in the order of an aperture of 1.4 mm and an aperture of 1.7 mm, the samples were placed on the 1.7 mm sieve, and shaken. Thereafter, 20 pelletized particles on a 1.4 mm sieve were measured, and an average value was obtained as the hardness of the pelletized particles.

Sieve Residue

Based on the manual sieving of JIS K 0069 dry sieving test method, the sieve was tilted 20 degrees using a 200 micron sieve, and the sieve was manually tapped at a rate of 120 times per minute and calculated from the residual weight on the sieve.

Rubber Formulation Preparation Method and Related Methods for Measuring Physical Properties Formulation Preparation Method 1

A sample for rubber test was prepared according to the following mixing procedure according to the formulation shown in Table 1. 100 parts by weight of a commercially available NBR (acrylonitrile butadiene rubber) was wrapped around an 8-inch open roll, masticating was performed for 3 minutes, and then Formulation A was sequentially added over 35 minutes. After the masterbatch was cooled at room temperature, 30 parts by weight of the hydrous silica of Formulation B was mixed sufficiently again with the 8-inch open roll to obtain an unvulcanized rubber composition.

Measurement of Dust Concentration

When the hydrous silica was mixed into the masterbatch, a digital dust meter (type: LD-5D; manufactured by Shibata Scientific Co.) was installed at 30 cm directly above the 8-inch open roll, and dust was measured when 30 parts by weight of the hydrous silica was put into the masterbatch. The mass concentration conversion factor (K value, dust concentration=K value×CPM) was calculated from the relative dust concentration (CPM) measured by a digital dust meter, and converted to the dust concentration (g/m$^3$).

TABLE 1

| Formulation | | Amount of compounding | Remarks |
|---|---|---|---|
| Polymer | NBR | 100 | Acrylonitrile butadiene rubber (Nipol 1042, manufactured by Zeon Corporation) |

TABLE 1-continued

| Formulation | | Amount of compounding | Remarks |
|---|---|---|---|
| Formulation A | Stearic acid | 1.5 | (Tsubaki, manufactured by NOF Corporation) |
| | Zinc oxide | 5.0 | Zinc oxide (Class 2, manufactured by Sakai Chemical Industry Co.) |
| | Rubber accelerator 1 | 1.5 | N-cyclohexyl-2-benzothiazolylsulfenamide (SANCELER CZ, manufactured by Ouchi Shinko Chemical Industrial Co., Ltd.) |
| | Rubber accelerator 2 | 1.5 | Tetramethylthiuram disulfide (NOCCELER TT-P, manufactured by Ouchi Shinko Chemical Industrial Co., Ltd.) |
| | Sulfur | 0.7 | Powder sulfur 200 mesh (Tsurumi Chemical Co., Ltd.) |
| | Aging inhibitor | 1.5 | N-phenyl-N'-isopropyl-p-phenylenediamine (NOCRAC 810-NA, manufactured by Ouchi Shinko Chemical Industrial Co., Ltd.) |
| Formulation B | Hydrous silica | 30 | |

※ The units in the table are phr (parts by weight based on 100 parts by weight of polymer).

Formulation Preparation Method 2

A sample for rubber test was prepared according to the following mixing procedure according to the formulation shown in Table 2.

(i) 1.7 L Banbury mixer (manufactured by Kobe Steel) 700 g of polymer was masticated for 30 seconds, and the Formulation A in Table 2 was added. The compound temperature at the time of removal was adjusted by ram pressure and rotational speed so that the temperature was 140 to 150° C., and it was taken out after mixing for 5 minutes.

(ii) After the compound was cooled at room temperature, Formulation B of Table 2 was added in a 1.7 L Banbury mixer and mixed for 50 seconds (the temperature at the time of removal was set to 100° C. or less), and sheeting was performed in an 8-inch open roll to obtain an unvulcanized rubber composition.

TABLE 2

| Formulation | | Amount of compounding | Remarks |
|---|---|---|---|
| Polymer | SBR | 80 | Styrene-butadiene rubber (SL-552, manufactured by JSR Corporation) |
| | IR | 20 | Isoprene rubber (IR2200, manufactured by JSR Corporation) |
| Formulation A | Hydrous silica | 45 | |
| | Stearic acid | 2.0 | (Tsubaki manufactured by NOF Corporation) |
| | The silane coupling agent | Variable | Bis(triethoxysilylpropyl)tetrasulfide (KBE-846, manufactured by Shin-Etsu Chemical Co., Ltd.) |
| Formulation B | Zinc oxide | 3.0 | Zinc oxide (Class 2, manufactured by Sakai Chemical Industry Co.) |
| | Aging inhibitor | 1.0 | N-phenyl-N'-isopropyl-p-phenylenediamine (NOCRAC 810-NA, manufactured by Ouchi Shinko Chemical Industrial Co., Ltd.) |
| | Rubber accelerator 1 | 1.2 | 1,3-diphenylguanidine (SANCELER D, manufactured by Ouchi Shinko Chemical Industrial Co., Ltd.) |
| | Rubber accelerator 2 | 1.5 | N-cyclohexyl-2-benzothiazolylsulfenamide (NOCCELER CZ, manufactured by Ouchi Shinko Chemical Industrial Co., Ltd.) |
| | Sulfur | 1.5 | Powder sulfur 200 mesh (manufactured by Tsurumi Chemical Co., Ltd.) |

※ The units in the table are phr (parts by weight based on 100 parts by weight of polymer).
※ Amount of silane coupling agent mixed (variable) = CTAB specific surface area × 0.029 − 0.185

Formulation Preparation Methods 1 and 2

Although the Formulation Preparation Methods 1 and 2 are not generally comparable, the mechanical strength (share of the formulation) at the time of compounding is weaker in the Formulation Preparation Method 1 and the difference is easier to distinguish. The Formulation Preparation Method 1 is relatively close to the formulation used in industrial rubber and the like, and the Formulation Preparation Method 2 is close to the formulation used in the tread portion of the tire. Since the physical properties of rubbers differ depending on the formulation, the present invention conducted the respective compounding tests to confirm the change in physical properties due to the difference in the type of formulation.

Vulcanization

The unvulcanized rubber composition was placed in a test piece molding die and vulcanized in a steam vulcanizing press (manufactured by Suetsugu Iron Works) at a temperature of 150° C. under a pressure of 4.0 to 18 MPa for 10 to 20 minutes to obtain test pieces.

The test piece mold used for vulcanization was as follows.

Tear strength measuring die (model: MP-124NJKAC; manufactured by Dumbell)

Dispersibility measuring die (model: MPA-609AK; manufactured by Dumbell)

Abrasion test die (model: MPL-309LAKC; manufactured by Dumbell)

Dispersibility Evaluation

Based on ISO 11345, the test piece cross section after vulcanization was measured using Dispergrader 1000 (manufactured by OPTIGRADE Co.). The degree of dispersion was evaluated as the X value. The larger the value, the better the dispersibility, and the evaluation was performed in four stages of A, B, C, and D. In Formulation Preparation Method 1, X values of >8.5 were defined as A, 8.0 to 8.5 as B, 7.5 to 8.0 as C, and less than 7.5 as D. In Formulation Preparation Method 2, X values of >8.0 were defined as A, 7.5 to 8.0 as B, 7.0 to 7.5 as C, and less than 7.0 as D. In both cases, B or higher was considered acceptable.

Tear Strength

JIS K 6252-1 (vulcanized rubber and thermoplastic rubber-how to determine the tear strength-) based on the test method B, the vulcanized rubber sheet, punched into an angle type (without notches) using a cutting machine, the shopper-type tensile testing machine (manufactured by Shimadzu Corporation) tensile until the test piece was broken, it was determined the tear strength. Measurement results were obtained by the index in the case of reference example 1 being 100 (reference). The higher the index, the higher the tear strength, which was evaluated in 4 stages of A, B, C, and D. In Formulation Preparation Method 1, when the tear strength was improved by 15% or more from the standard (index 115 or more), the tear strength was A, when the tear strength was improved by 5 to 10% (index 105 to 110) was B, when the tear strength was equivalent to the standard (index 95 to 105) was C, and when the tear strength was worsened from the standard (index less than 95) was D. In Formulation Preparation Method 2, tear strength increased by 10% or more from the standard (index 110 or more) was defined as A, that increased by 5 to 10% (index 105 to 110) was defined as B, that comparable to the standard (index 95 to 105) was defined as C, and that worsened from the standard (index 95 or less) was defined as D. In both cases, B or higher was considered acceptable.

Wear Resistance Test

Based on JIS K 6264-2 (vulcanized rubber and thermoplastic rubber-how to determine the wear resistance-), the results were measured with an Akron-type wear tester. A test piece of diameter $\phi$63.5 mm, a thickness of 12.7 mm and the center hole 12.7 mm was set, after running-in operation 1,000 revolutions at the inclination angle 15°, load 27 N, and a rotation speed of 75 rpm of the test piece, the test 1,000 revolutions in the same conditions was conducted and then wear volume reduction was measured. Measurement results were obtained by the index in the case of reference example 1 being 100 (reference). The higher the index, the better the wear resistance, and the evaluation was carried out in four stages of A, B, C, and D. In Formulation Preparation Method 1, when the wear resistance was improved by 20% or more from the standard (index 120 or more), it was A, when the wear resistance was improved by 10 to 20% (index 110 to 120), it was B, when the wear resistance was equivalent to the standard (index 90 to 110), it was C and when the wear resistance was worsened from the standard (index 90 or less), it was D. In Formulation Preparation Method 2, the case where the wear resistance was improved by 30% or more from the standard (index 130 or more) was designated as A, the case where the wear resistance was improved by 10 to 30% (index 110 to 130) was designated as B, the case where the wear resistance was equivalent to the standard (index 90 to 110) was designated as C, and the case where the wear resistance was worsened from the standard (index 90 or less) was designated as D. In both cases, B or higher was considered acceptable.

Example 1

Hydrous silica was produced and evaluated through the following steps i) to vii). Steps i) to iv) below were carried out in a 240-liter stainless steel container equipped with a stirrer and a circulation pump while maintaining the temperature at 76° C. while constantly stirring and circulating. As the aqueous solution of sodium silicate described below, No. 3 sodium silicate having a $SiO_2$ concentration of 12.8 wt %, a $Na_2O$ concentration of 4.0 wt %, and a $SiO_2/Na_2O$ molar ratio of 3.2 was used, and 95 wt % concentrated sulfuric acid was used as sulfuric acid.

i) An aqueous solution of sodium silicate was added to 80 liters of warm water until pH reached 11.5.

ii-1) 1.06 liters of sulfuric acid was added dropwise simultaneously for 35 minutes with aqueous sodium silicate solution whose flow rate was adjusted to maintain pH 11.5.

ii-2) The addition of aqueous sodium silicate solution was then stopped and only sulfuric acid was added dropwise until pH reached 11.0.

ii-3) The aqueous solution of sodium silicate and sulfuric acid were simultaneously added dropwise for 15 minutes at the same flow rate as in step ii-1) while maintaining pH at 11.0.

iii) The flow rates of the aqueous solution of sodium silicate and sulfuric acid were adjusted so that the flow rates of the aqueous solution of sodium silicate and sulfuric acid were 43% with respect to the steps ii-1) and ii-3), and were simultaneously added dropwise over 60 minutes while maintaining pH 11.0.

iv) The dropping of the aqueous solution of sodium silicate was stopped, and only sulfuric acid was dropped to lower the pH, and when pH reached 3.0, the dropping of sulfuric acid was also stopped to completely terminate the neutralization reaction, and a hydrous silica slurry was obtained.

v) The obtained hydrous silica slurry was filtered by a filter press and washed with water to obtain a hydrous silica cake.

vi) The hydrous silica cake was slurried by adding water so as to have a $SiO_2$ content of 120 g/liter, and then dried using a spray dryer (type: AN-40R type: made by Ashizawa Niloatomizer) so that the moisture content was less than 9%.

vii) The obtained dry powder was mixed and compacted using a roller compacting machine (Roller compactor, model: FR125×40 model manufactured by Turbo Industry Co., Ltd.) and an attached screw feeder to obtain a hydrous silica compacting. Note that the conditions for mixing and compacting were a feed rate of 11.3 kg/h, a roll interval of 1.05 mm, a compression pressure of 0.3 ton/cm, and a roll speed of 8 rpm.

Example 2

Hydrous silica was produced and evaluated through the following steps i) to vii). The device, the aqueous solution of sodium silicate, the sulfuric acid, and the temperatures up to the step i) were carried out under the same conditions as in the EXAMPLE 1.

i) An aqueous solution of sodium silicate was added to 80 liters of warm water until pH reached 11.5.

ii-1) Sulfuric acid alone was then added dropwise to lower the pH to 11.0.

ii-2) 0.76 liters of sulfuric acid were added dropwise simultaneously for 25 minutes with aqueous sodium silicate solution whose flow rate was adjusted to maintain pH 11.0.

iii-1) For step ii-2), the flow rate was adjusted so that the flow rate of the aqueous solution of sodium silicate and the flow rate of sulfuric acid became 43%, and simultaneously dropped over 25 minutes while maintaining pH 11.0.

ii-3) The aqueous solution of sodium silicate and sulfuric acid were simultaneously added dropwise for 20 minutes at the same flow rate as in step ii-2) while maintaining pH at 11.0.

iii-2) Next, while maintaining pH at 11.0, the aqueous solution of sodium silicate and sulfuric acid were simultaneously added dropwise for 40 minutes at the same flow rate as in the step iii-1).

Thereafter, steps iv) to vi) were carried out under the same conditions as in Example 1.

vii) Except for that the feed amount of the dry powder obtained in vi) was increased to 11.5 kg/h, a compacted hydrous silica was obtained by compacting under the same conditions as in Example 1.

Example 3

Hydrous silica was produced and evaluated through the following steps i) to vii). The device, the aqueous solution of sodium silicate, the sulfuric acid, and steps up to step i) were carried out under the same conditions as in Example 1, except that the temperatures were set to at 81° C.
 i) An aqueous solution of sodium silicate was added to 80 liters of warm water until pH reached 11.5.
 ii-1) 0.61 liters of sulfuric acid were added dropwise simultaneously for 20 minutes with aqueous sodium silicate solution whose flow rate was adjusted to maintain pH 11.5.
 ii-2) The addition of aqueous sodium silicate solution was then stopped and only sulfuric acid was added dropwise until pH reached 11.0.
 ii-3) The aqueous solution of sodium silicate and sulfuric acid were simultaneously added dropwise for 30 minutes at the same flow rate as in step ii-1) while maintaining pH at 11.0.
 iii) The flow rates of the aqueous solution of sodium silicate and sulfuric acid were adjusted so that the flow rates of the aqueous solution of sodium silicate and sulfuric acid were 43% with respect to the steps ii-1) and ii-3), and were simultaneously added dropwise over 60 minutes while maintaining pH 11.0.

Thereafter, steps iv) to vi) were carried out under the same conditions as in Example 1.
 vii) Except for that the feed amount of the dry powder obtained in vi) was increased to 13.2 kg/h, a compacted hydrous silica was obtained by compacting under the same conditions as in Example 1.

Example 4

Hydrous silica was produced and evaluated through the following steps i) to vii). The device, the aqueous solution of sodium silicate, and the sulfuric acid were carried out under the same conditions as in Example 1, except for that the temperatures were set to at 85° C.
 i) An aqueous solution of sodium silicate was added to 80 liters of warm water until pH reached 11.7.
 ii-1) Sulfuric acid alone was then added dropwise to lower the pH to 11.0.
 ii-2) 1.52 liters of sulfuric acid were added dropwise simultaneously for 50 minutes with aqueous sodium silicate solution whose flow rate was adjusted to maintain pH 11.0.
 iii) The flow rate was adjusted so that the flow rate of the aqueous solution of sodium silicate and the flow rate of sulfuric acid became 43% with respect to the process ii-2), and simultaneously dropped over 60 minutes while maintaining pH 11.0.

Thereafter, steps iv) to vi) were carried out under the same conditions as in Example 1.
 vii) Except for that the feed amount of the dry powder obtained in vi) was increased to 11.6 kg/h, a compacted hydrous silica was obtained by compacting under the same conditions as in Example 1.

Example 5

Hydrous silica was produced and evaluated through the following steps i) to vii). Except for that the temperatures were set to at 87° C., the device, the aqueous solution of sodium silicate, and the sulfuric acid were carried out under the same conditions as in Example 1.
 i) An aqueous solution of sodium silicate was added to 80 liters of warm water until pH reached 11.6.
 ii-1) 1.06 liters of sulfuric acid was added dropwise simultaneously for 35 minutes with aqueous sodium silicate solution whose flow rate was adjusted to maintain pH 11.5.
 ii-2) The addition of aqueous sodium silicate solution was then stopped and only sulfuric acid was added dropwise until pH reached 11.0.
 ii-3) The aqueous solution of sodium silicate and sulfuric acid were simultaneously added dropwise for 15 minutes at the same flow rate as in step ii-1) while maintaining pH at 11.0.
 iii) The flow rates of the aqueous solution of sodium silicate and sulfuric acid were adjusted so that the flow rates of the aqueous solution of sodium silicate and sulfuric acid were 43% with respect to the steps ii-1) and ii-3), and were simultaneously added dropwise over 60 minutes while maintaining pH 11.0.

Thereafter, steps iv) to vi) were carried out under the same conditions as in Example 1.
 vii) Except for that the feed amount of the dry powder obtained in vi) was increased to 11.7 kg/h, a compacted hydrous silica was obtained by compacting under the same conditions as in Example 1.

Reference Example 1

Nipsil KQ (made by Tosoh-Silica) was used as an example of hydrous silica, which has a BET-specific surface area of 220 $m^2/g$ or more and is commercially available as hydrous silica for rubber-reinforcing fillers. The physical properties of the rubber compound, such as the wear resistance and the tear strength, were evaluated by an index using the physical properties of Nipsil KQ as a reference (100).

Comparative Example 1

Silica cake was produced in the same formulation as the method described in Example 5 of JP-A-2017-514773 (Patent document 1), to obtain a hydrous silica in the form of substantially spherical beads having a BET specific surface area of 250 $m^2/g$.

The same device (reactor) as in Example 1 was used for the production, and neutralization of hydrous silica was synthesized at a dosage of 1/11 of that of Example 5 in JP-A-2017-514773, and after the silica cake was obtained by filtration with a filter press, the solution was dried so that the moisture content was less than 9% by the process of step vi) of Example 1, except for that a predetermined amount of a sodium aluminate solution and a neutralization solution were added. However, the operation of the step vii) of Example 1 was not performed according to the method of the prior art document 1.

Comparative Example 2

Using the same reaction vessel as in Example 1, a hydrous silica was produced in the same formulation as in Example 2 of JP-A-2012-17440, followed by compacting the hydrous silica under the same conditions as in step vii) of Example 4 to obtain a compacted hydrous silica. The production was carried out at a 1.3-fold dose compared to Production Example 2 of JP-A-2012-17440.

In the manufacturing methods of Comparative Examples 1 and 2, there is no step corresponding to step iii) of Examples 1 to 5. Further, in the manufacturing methods of Comparative Example 1, there is no step corresponding to the step vii) of Examples 1 to 5.

Description of Results

Figure 1:
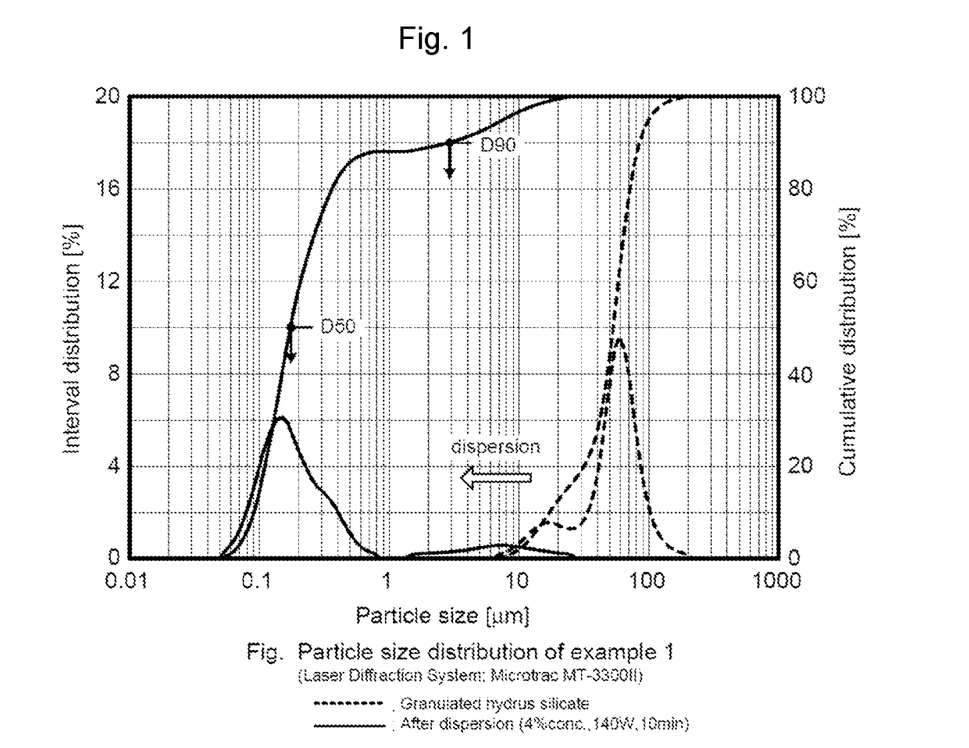
FIG. 1 shows a particle size distribution diagram including a cumulative volume ratio of a hydrous silica slurry of the hydrous silica obtained in Example 1 adjusted to 4% by weight before and after dispersing for 10 minutes with an ultrasonic homogenizer having an output of 140 W.

FIG. 1 shows a particle size distribution diagram including a cumulative volume ratio of the hydrous silica obtained in Example 1 and adjusted to a hydrous silica slurry of 4% by weight, before and after dispersing for 10 minutes with an ultrasonic homogenizer having an output of 140 W.

Figure 2:
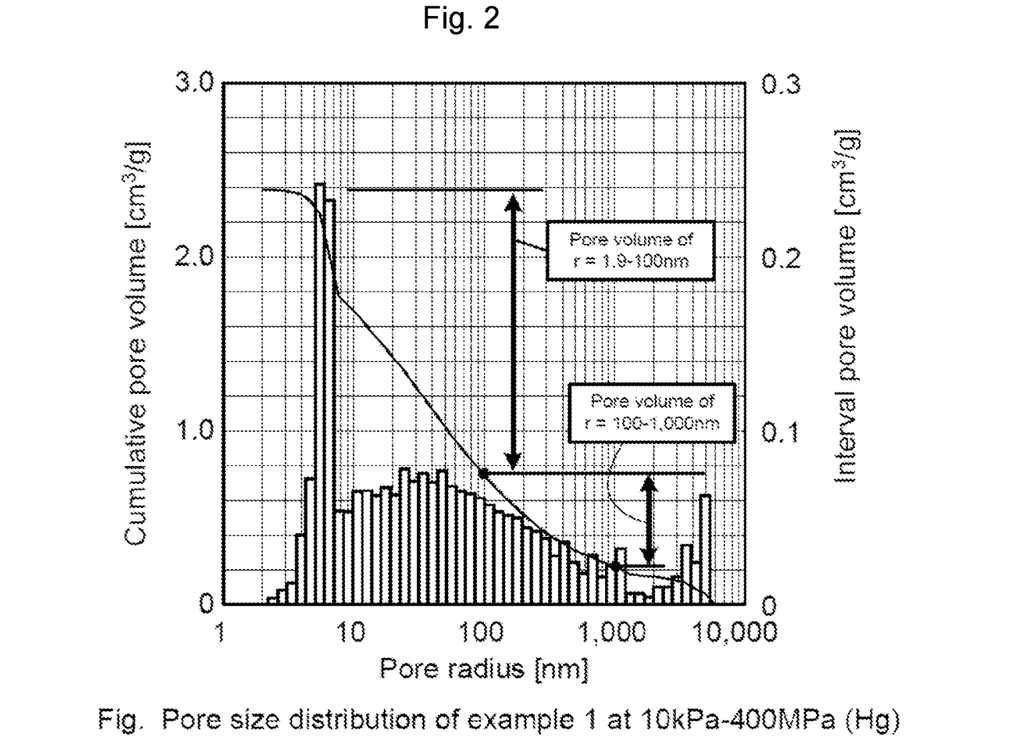
FIG. 2 is a pore distribution diagram including the cumulative pore volume of mercury press-in method 1 (measurement range r=1.9 to 6,400 nm).
Figure 3:
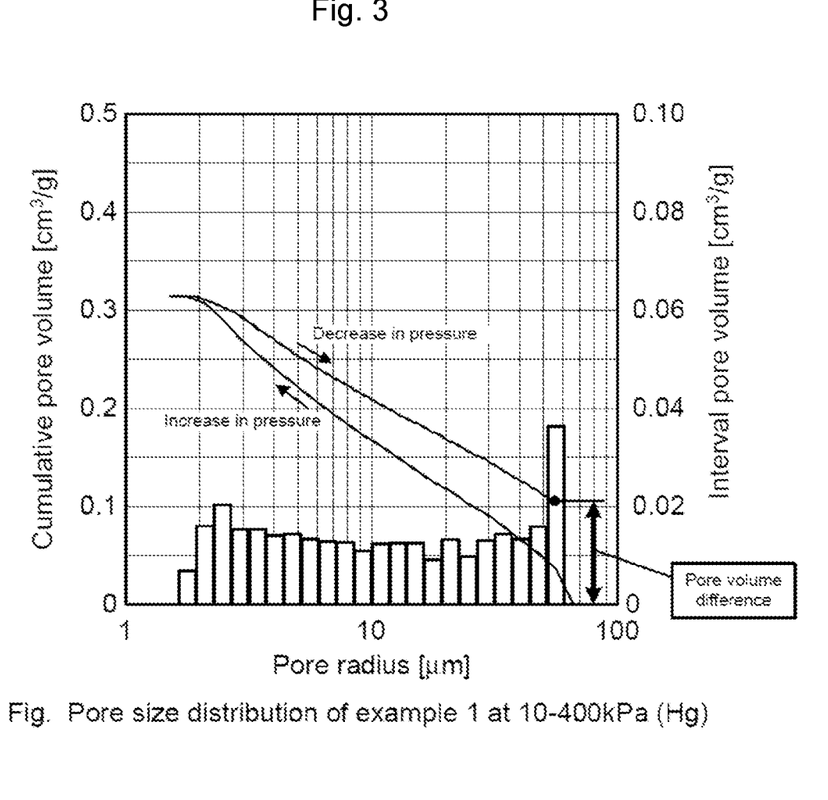
FIG. 3 is a pore distribution diagram including the cumulative pore volume of mercury press-in method 2 (measurement range r=1.6 to 62 μm [1,600 to 62,000 nm]) obtained in Example 1.

FIGS. 2 and 3 show pore distribution diagrams including cumulative pore volumes of the mercury press-in method 1 (measurement range r=1.9 to 6,400 nm) and the mercury press-in method 2 (measurement range r=1.6 to 62 μm [1,600 to 62,000 nm]) obtained in Example 1.

From these figures and measured data, the pore volume in the range of 100 to 1,000 nm by the mercury press-in method, the pore volume in the range of 1.6 to 62 μm (1,600 to 62,000 nm) by the mercury press-in method and the hysteretic pore volume difference, i.e., the pore volume when pressure was raised and then depressurized, were obtained.

Results Description (Table)

The physical properties of the hydrous silica of Examples 1 to 5 and Comparative Examples 1 to 2 are shown in Table 3, and the results of the rubber compounding test are shown in Table 4.

TABLE 3-1

Hydrous silica properties of the examples

| | | | | EXAMPLE | | | | |
|---|---|---|---|---|---|---|---|---|
| | | | Preferably | 1 | 2 | 3 | 4 | 5 |
| Physical properties of hydrous silica | Moisture content | % | Less than 9% | 4.0 | 3.5 | 4.1 | 3.6 | 4.3 |
| | pH(4% Susp.) | | 5-8 | 6.0 | 5.6 | 6.2 | 6.0 | 6.4 |
| | Electric conductivity | μS/cm | 1,000 Less than | 45 | 82 | 64 | 45 | 40 |
| | BET specific surface area | m²/g | 230-350 | 322 | 293 | 277 | 256 | 241 |
| | Mercury pore volume High pressure side Vol. [$V_{HP-Hg}$] r: 1.9-100 nm | cm³/g | 1.40-2.00 | 1.64 | 1.74 | 1.71 | 1.82 | 1.69 |
| | Mercury pore volume Medium pressure side Vol. r: 100-1,000 nm | cm³/g | 0.50-1.00 | 0.51 | 0.66 | 0.62 | 0.74 | 0.87 |
| | Particle diameter dispersed by ultrasonic homogenizer after 10 minutes | D50 | 3.0 μm or less | 0.18 | 0.43 | 0.25 | 2.80 | 0.26 |
| | | D90 | 10.0 μm or less | 2.96 | 8.98 | 2.81 | 6.92 | 8.34 |
| | Mercury pore volume Low pressure side Vol. r: 1.6-62 μm (1,600-62,000 nm) | cm³/g Hysteresis cm³/g | 0.18-0.80 0.07 or more | 0.31 0.11 | 0.26 0.11 | 0.18 0.10 | 0.43 0.18 | 0.24 0.12 |
| | CTAB specific surface area | m²/g | 200-350 | 273 | 247 | 238 | 243 | 205 |
| | Pellet hardness | cN | 5-35 | 11 | 19 | 32 | 18 | 20 |
| | Residue on sieve | % | 70 or more | 80 | 85 | 90 | 90 | 85 |

TABLE 3-2

Physical properties of hydrous silica in Reference Examples and Comparative Examples

| | | | | Reference Example | Comparative Example | |
|---|---|---|---|---|---|---|
| | | | Preferably | 1 | 1 | 2 |
| Physical properties of hydrous silica | Moisture content | % | Less than 9% | 6.0 | 4.6 | 5.8 |
| | pH | | 5-8 | 6.1 | 6.6 | 5.9 |
| | Electric conductivity | μS/cm | 1,000 Less than | 146 | 408 | 217 |
| | BET specific surface area | m²/g | 230-350 | 222 | 250 | 262 |

TABLE 3-2-continued

Physical properties of hydrous silica in Reference Examples and Comparative Examples

|  |  |  | Preferably | Reference Example 1 | Comparative Example 1 | Comparative Example 2 |
|---|---|---|---|---|---|---|
| Mercury pore volume High pressure side Vol. [$V_{HP-Hg}$] r: 1.9-100 nm | | cm³/g | 1.40-2.00 | 1.65 | 1.59 | 1.44 |
| Mercury pore volume Medium pressure side Vol. r: 100-1,000 nm | | cm³/g | 0.50-1.00 | 0.55 | 0.34 | 0.41 |
| Particle diameter dispersed by ultrasonic homogenizer after 10 minutes | D50 | | 3.0 μm or less | 7.89 | 13.8 | 3.25 |
| | D90 | | 10.0 μm or less | 25.9 | 24.6 | 11.6 |
| Mercury pore volume Low pressure side Vol. r: 1.6-62 μm (1,600-62,000 nm) | | cm³/g | 0.18-0.80 | 1.63 | 1.53 | 1.06 |
| | Hysteresis | cm³/g | 0.07 or more | 0.40 | 0.44 | 0.31 |
| CTAB specific surface area | | m²/g | 200-350 | 205 | 250 | 191 |
| Pellet hardness | | cN | 5-35 | CNM | CNM | 24 |
| Residue on sieve | | % | 70 or more | 0 | 0 | 95 |

CNM: Could not be measured

TABLE 4

Results of Rubber Compound Test by Formulation Preparation Method 1 (FP Method 1) and Formulation Preparation Method 2 (FP Method 2)

|  |  |  |  | EXAMPLE 1 | EXAMPLE 2 | EXAMPLE 3 | EXAMPLE 4 | EXAMPLE 5 |
|---|---|---|---|---|---|---|---|---|
| FP Method 1 | Dust Concentration | mg/m³ | A: less than 1.5<br>B: 1.5-3.0<br>C: 3.0-4.5<br>D: 4.5 or more | 1.0<br>A | 1.3<br>A | 1.6<br>B | 1.2<br>A | 1.5<br>B |
| | Dispersibility Evaluation | X-value | A: 8.5 or more<br>B: 8.0-8.5<br>C: 7.5-8.0<br>D: less than 7.5 | 8.7<br>A | 8.3<br>B | 8.4<br>B | 8.5<br>A | 8.7<br>A |
| | Tearing Strength | Index | A: 115 or more<br>B: 105-115<br>C: 95-105<br>D: less than 95 | 121<br>A | 121<br>A | 119<br>A | 116<br>A | 112<br>B |
| | Wear resistance | Index | A: 120 or more<br>B: 110-120<br>C: 90-110<br>D: less than 90 | 129<br>A | 124<br>A | 114<br>B | 119<br>B | 116<br>B |
| FP Method 2 | Dispersibility Evaluation | X-value | A: 8.0 or more<br>B: 7.5-8.0<br>C: 7.0-7.5<br>D: less than 7.0 | 8.3<br>A | 8.0<br>A | 7.9<br>B | 8.1<br>A | 8.3<br>A |
| | Tearing Strength | Index | A: 110 or more<br>B: 105-110<br>C: 95-105<br>D: less than 95 | 110<br>A | 109<br>B | 109<br>B | 113<br>A | 106<br>B |
| | Wear resistance | Index | A: 130 or more<br>B: 110-130<br>C: 90-110<br>D: less than 90 | 169<br>A | 145<br>A | 135<br>A | 128<br>B | 119<br>B |

TABLE 4-continued

|  |  |  |  | Reference Example 1 | Comparative Example 1 | Comparative Example 2 |
|---|---|---|---|---|---|---|
| FP Method 1 | Dust Concentration | mg/m$^3$ | A: less than 1.5<br>B: 1.5-3.0<br>C: 3.0-4.5<br>D: 4.5 or more | 1.2<br>A | 4.4<br>C | 0.8<br>A |
|  | Dispersibility Evaluation | X-value | A: 8.5 or more<br>B: 8.0-8.5<br>C: 7.5-8:0<br>D: less than 7.5 | 7.7<br>C | 6.7<br>D | 7.8<br>C |
|  | Tearing Strength | Index | A: 115 or more<br>B: 105-115<br>C: 95-105<br>D: less than 95 | 100<br>C | 107<br>B | 93<br>D |
|  | Wear resistance | Index | A: 120 or more<br>B: 110-120<br>C: 90-110<br>D: less than 90 | 100<br>C | 45<br>D | 65<br>D |
| FP Method 2 | Dispersibility Evaluation | X-value | A: 8.0 or more<br>B: 7.5-8 0<br>C: 7.0-7.5<br>D: less than 7.0 | 7.4<br>C | 7.4<br>C | 7.4<br>C |
|  | Tearing Strength | Index | A: 110 or more<br>B: 105-110<br>C: 95-105<br>D: less than 95 | 100<br>C | 98<br>C | 94<br>D |
|  | Wear resistance | Index | A: 130 or more<br>B: 110-130<br>C: 90-110<br>D: less than 90 | 100<br>C | 77<br>D | 76<br>D |

Discussion (Description)

The hydrous silica of the Examples of Table 3-1 all have D50 of 3.0 μm or less and D90 of 10.0 μm or less.

In the evaluation of the wear resistance and the tear strength in Table 4, both of the compound preparation methods 1 and 2 show a remarkable improvement effect as compared with the comparative example.

Particularly, the improvement effect of the wear resistance is remarkable, and at the same time, in addition to the improvement of the reinforcing property, the powder standing is less and the handling performance is also kept.

Reference example 1 is a commercially available hydrous silica having a low dust concentration and good workability, although the pellet hardness was not measurable because of the granular state of fine particles. (Evaluation Standard for Rubber Physical Properties)

In Comparative Example 1, the BET specific surface area is greater than or equal to 230 m$^2$/g but D50 is 13.8 μm and D90 is 24.6 μm. Although there is a possibility that the dust concentration and the like can be improved by performing the compaction, the dispersibility in the rubber and the reinforcing property were expected to be further lowered, and therefore, the rubber physical properties were evaluated without performing the compaction.

Comparative Example 2 has 3.25 μm of D50 and 11.6 μm of D90 so that it is unlikely that rubber reinforcement (particularly the wear resistance) can be significantly improved.

In summary, since the hydrous silica of Examples 1 to 5 has a high specific surface area and D50 is 3.0 μm or less and D90 is 10.0 μm or less, high wear resistance and high tear strength are obtained when mixed into rubbers. In addition, it has a feature that it is easy to disperse even when it is compacted, and it is understood that it is an excellent hydrous silica having improved workability. In particular, Example 1, before the ultrasonic homogenizer dispersion, D50 was 50 μm or more and D90 was 80 μm or more, but by ultrasonic homogenizer dispersion (corresponding to energy during rubber mixing), it was dispersed as small as 0.18 μm of D50 and 2.96 μm of D90 and the effect of the wear resistance improvement is significant.

As explained above, the hydrous silica of the present invention has a BET specific surface area ranging from 230 to 350 m$^2$/g but D50 is 3.0 μm or less and D90 is 10.0 μm or less. Therefore, it can be compounded into rubber with improved handling performance, and when compounded, it can be dispersed well, and high reinforcing properties (particularly the wear resistance) can be obtained.

Accordingly, it is possible to provide a hydrous silica having excellent rubber reinforcing properties, particularly the wear resistance, in which the rubber reinforcing properties are added by improving handling performance when compounded into the rubber, making the BET specific surface area within a predetermined range, and improving dispersibility of the hydrous silica into the rubber.

INDUSTRIAL APPLICABILITY

The present invention has utility in the art where hydrous silica is involved.

The invention claimed is:
1. A hydrous silica for rubber reinforcing filler characterized in that the hydrous silica has:
   a BET-specific surface area ranging from 230 m$^2$/g to 350 m$^2$/g;
   a volume average particle diameter (D50) of 3.0 μm or less, as measured by a laser diffraction method after dispersing 50 ml of a hydrous silica slurry adjusted to 4% hydrous silica by weight with an ultrasonic homogenizer having an output of 140 W for 10 minutes; and a top 10% of particles (D90) in a particle size distribution of the hydrous silica have a particle size of 10.0 μm or less.

2. The hydrous silica according to claim 1, further comprising a pore volume of pores of the hydrous silica with a 1.9 nm to 100 nm pore radius, measured by a mercury press-in method, that ranges from 1.40 cm$^3$/g to 2.00 cm$^3$/g.

3. The hydrous silica according to claim 2, further comprising a pore volume of pores of the hydrous silica in a range of 100 nm to 1,000 nm of pore radius, as measured by a mercury press-in method, that ranges from 0.50 cm$^3$/g to 1.00 cm$^3$/g.

4. The hydrous silica according to claim 2, further comprising a pore volume of pores of the hydrous silica in a range of 1.6 μm to 62 μm of pore radius, measured by a mercury press-in method, that ranges from 0.18 cm$^3$/g to 0.80 cm$^3$/g, and a hysteretic pore volume difference in a range of 10 kPa to 400 kPa, measured by the mercury press-in method, is 0.07 cm$^3$/g or more.

5. The hydrous silica according to claim 2, further comprising a CATB specific surface area that ranges from 200 m$^2$/g to 350 m$^2$/g.

6. The hydrous silica according to claim 2, further comprising a pH of a 4% by weight slurry that is in a range of 5 to 8, an electric conductivity of the filtrate of the slurry is less than 1,000 μS/cm, and a moisture content of the hydrous silica is less than 9%.

7. The hydrous silica according to claim 1, further comprising a pore volume of pores of the hydrous silica in a range of 100 nm to 1,000 nm of pore radius, as measured by a mercury press-in method, that ranges from 0.50 cm$^3$/g to 1.00 cm$^3$/g.

8. The hydrous silica according to claim 7, further comprising a CATB specific surface area that ranges from 200 m$^2$/g to 350 m$^2$/g.

9. The hydrous silica according to claim 7, further comprising wherein a pH of a 4% by weight slurry that is in a range of 5 to 8, an electric conductivity of the filtrate of the slurry is less than 1,000 μS/cm, and a moisture content of the hydrous silica is less than 9%.

10. The hydrous silica according to claim 1, further comprising a pore volume of pores of the hydrous silica in a range of 1.6 μm to 62 μm of pore radius, measured by a mercury press-in method, that ranges from 0.18 cm$^3$/g to 0.80 cm$^3$/g, and a hysteretic pore volume difference in a range of 10 kPa to 400 kPa, measured by the mercury press-in method, is 0.07 cm$^3$/g or more.

11. The hydrous silica according to claim 10, further comprising wherein a CATB specific surface area that ranges from 200 m$^2$/g to 350 m$^2$/g.

12. The hydrous silica according to claim 10, further comprising a pH of a 4% by weight slurry that is in a range of 5 to 8, an electric conductivity of the filtrate of the slurry is less than 1,000 μS/cm, and a moisture content of the hydrous silica is less than 9%.

13. The hydrous silica according to claim 1, further comprising a CATB specific surface area that ranges from 200 m$^2$/g to 350 m$^2$/g.

14. The hydrous silica according to claim 1, further comprising a pH of a 4% by weight slurry that is in a range of 5 to 8, an electric conductivity of the filtrate of the slurry is less than 1,000 μS/cm, and the hydrous silica has a moisture content is less than 9%.

* * * * *